United States Patent
Satoh

[19]

[11] Patent Number: 6,113,263
[45] Date of Patent: Sep. 5, 2000

[54] CONTACT-TYPE THERMOMETER

[75] Inventor: Yoshinobu Satoh, Tokyo, Japan

[73] Assignee: Anritsu Meter Co., Ltd., Tokyo, Japan

[21] Appl. No.: 09/075,839

[22] Filed: May 12, 1998

[30] Foreign Application Priority Data

May 14, 1997 [JP] Japan ..................................... 9-124361

[51] Int. Cl.$^7$ .............................. G01K 1/16; G01K 7/00; G01K 1/14
[52] U.S. Cl. .......................... 374/179; 374/120; 374/153; 374/185
[58] Field of Search ..................... 374/179, 126, 374/153, 185, 120

[56] References Cited

U.S. PATENT DOCUMENTS

| | | | |
|---|---|---|---|
| 3,285,069 | 11/1966 | Weiss ....................................... | 374/153 |
| 4,091,673 | 5/1978 | Tamura et al. .......................... | 374/120 |
| 4,859,081 | 8/1989 | Kabayashi ............................... | 374/179 |
| 5,172,979 | 12/1992 | Barkley et al. .......................... | 374/208 |
| 5,281,793 | 1/1994 | Gavin et al. ............................. | 374/153 |
| 5,366,291 | 11/1994 | Nakagama et al. ..................... | 374/153 |
| 5,562,027 | 10/1996 | Moore ..................................... | 374/153 |
| 5,765,075 | 6/1998 | Yamamoto ............................... | 374/120 |

*Primary Examiner*—G. Bradley Bennett
*Assistant Examiner*—Gail Verbitsky
*Attorney, Agent, or Firm*—Arent Fox Kintner Plotkin & Kahn, PLLC

[57] ABSTRACT

A contact-type thermometer which is supported by fixing a contact plate having a supporting bar on both sides of an annular elastic member that is formed by connecting both sides of an elastic sheet. A temperature sensitive portion is arranged between the annular elastic member and the contact plate to hold a portion attached to the contact plate of the annular elastic member and the opposite side using the support. In addition, clearance fixing the supporting bar into a guide hole that is long from side to side in a holder such that the contact plate contacts an object to be temperature measured in parallel. The elastic force acting on the back of the contact plate under the condition of the elastically deforming annular elastic member becomes slightly flat, wherein the contact plate does not float more than a distance to the surface of the object to be temperature measured, so the temperature can be accurately measured.

12 Claims, 5 Drawing Sheets

CONTACT-TYPE THERMOMETER

FIELD OF THE INVENTION

The present invention relates to an improvement of a contact-type thermometer well adapted to contact with a moving material or a product in, for example, a manufacture process of an aluminum foil and a manufacture process of a glass or a manufacture process of various sheet-shaped objects to measure.

BACKGROUND OF THE INVENTION

For example, an aluminum sheet is in the manufacture processes of the aluminum thinning sheet and the aluminum foil when the aluminum sheet is rolled to be thinned, a surface thereof becomes a mirror-smooth state increasingly in response to increase of the moving speed. In the manufacture processes of such aluminum sheet and aluminum foil, the aluminum thinning sheet and the aluminum foil which is uniform in thickness and excellent in quality without a pin hole can be obtained by controlling a temperature and the moving speed of the moving aluminum sheet in the rolling process. In the case of measurement of temperature of an object being not moved, in general, the contact-type thermometer using a thermocouple as a temperature sensitive element is used, since it is compact in size and excellent in the measurement accuracy, in addition, durable and further, a low price.

Moreover, for example, when a dangerous object that the actual temperature can not be measured in close proximity due to a high temperature such as an inside of a blast furnace and the object positioned at the high elevations as an insulator of a high voltage transmission line and moreover, the dangerous place that there is the transmission line on which high voltage is supplied are measured, a radiation thermometer detecting the infrared energy radiated from the object thereof is used.

In the contact-type thermometer using the thermocouple, one of the type that a contact plate is arranged on the tip portion of a temperature measuring portion to fix a temperature sensitive portion (a contact point) of thermocouple wires on the back thereof is used greatly, and the thermometer is designed to measure in such manner that the temperature measuring portion in which there is said temperature sensitive portion is pressed against the object slightly. On the occasion of this measurement, the thermometer is designed to press the temperature measuring portion of the tip portion of the thermometer at the right angle against a surface of the object to be measured on temperature to hold under the condition of laying the contact plate along the surface thereof to accurately transmit the temperature of an object to be measured on temperature to the temperature sensitive portion of the thermocouple provided behind the contact plate.

As described above, in the case of measuring a accurate temperature using the contact-type thermometer, it is a condition that the object to be measured on temperature is standing still, but in contrast with this, in the case that the object to be measured on temperature is moving, the force to move in the movement direction thereof with frictional resistance by contacting with this moving object to be measured acts on the contact plate and the front side of the contact plate is pulled, so that the rear side is floated to be inclined to become unstable.

When this contact plate is pulled to be moved, the thermocouple attached thereto also is dragged to be moved in the same direction. Moreover, this contact plate becomes deformed in the form of a concave, so that the contact condition is ready to become unstable, therefore, it becomes the condition that the temperature sensitive portion of the thermocouple fixed behind the central portion of the contact plate is floated more than the surface of the object to be measured on temperature. when, thus, the contact plate is floated more than the surface of the object to be measured on temperature, a thin air layer between this temperature sensitive portion and the surface of the object to be measured is formed, and a temperature error caused by this air layer, whereby measuring the accurate temperature becomes difficult.

The contact-type thermometer using a thermocouple is not adapt to the thermometer for the moving surface, whereby it can not be used widely except the case of measuring an approximate temperature of the moving object.

On the other hand, the radiation thermometer measures the infrared energy radiated from the object to be measured on temperature, whereby the temperature of an object being standing still, as a matter of course, and the moving object also can be measured.

However, this radiation thermometer is remarkably expensive as compared to the thermocouple type thermometer, in addition, a big error in the measured value can be resulted depending upon the presence or absence of a color of the object and a luster such as the aluminum foil, and furthermore, the presence or absence of a property being optically transparent such as a glass.

Moreover, there is an essential problem that the measured value is influenced greatly depending upon an atmosphere of the path through which the infrared energy radiated from the object passes, for example, whether the measurement place are filled with vapors, smoke and gases or not and a degree of the concentration such as the vapors, whereby a correction is required considerably in order to measure a accurate temperature in addition, an experience is required in an operation also.

Therefore, when measuring a temperature using this thermometer, the measured value should be designed to correct the measured value in advance after obtaining a reflection factor or a transmission factor of the object to be measured on temperature in advance. Moreover, since the emissivity, the reflection factor or the condition (the generation of vapor and smoke) of the space through which infrared rays transmits are changed frequently during using, there is a problem that it is required to correct the measured value thereof with the passage of time.

DISCLOSURE OF THE INVENTION

The object of the invention is to provide a contact-type thermometer by which the accurate temperature can be measured in addition, which is ready to handle, while solving the problem that there is the luster in addition, the surface is ready to be flawed as described in said manufacture process of the aluminum foil.

More particularly, the object of the invention is to provide a contact-type thermometer by which the accurate temperature can be measured in contact with a moving surface in parallel.

The contact-type thermometer according to the invention for achieving said objects is constituted as follows:

1) The thermometer is arranged to be supported by fixing a contact plate provided a supporting bar on each side to an annular elastic member formed by connecting both sides of an elastic sheet: in addition, arranging a temperature sensitive portion between said annular elastic member and said contact plate:

allowing to hold the opposite side of a portion attached said contact plate of said annular elastic member by a support: in addition, fitting with clearance said supporting bars into guide holes each constituted by a hole long from side to side opened in a holder such that said contact plate contacts parallels to an object to be measured on temperature: and acting elastic force on the back of said contact plate under the condition of elastically deforming said annular elastic member so as to become slightly flat to support.

2) Said supporting bar provided both sides of said contact plate is located at an intermediate position under the condition that said contact plate is allowed to contacts with said object to be measured on temperature, and said each guide hole is a hole long from side to side along the upper edge of said holder, and the distances between said each supporting bar and both sides of said each guide hole are formed such that an inside distance of said annular elastic member side becomes shorter than an outside distance of the opposite side.

3) Said support and said holder are constituted integrally.

4) Said annular elastic member is formed so as to deform into a cocoon shape or an oval shape and symmetrically under the condition that said contact plate is allowed to contacts with said object to be measured on temperature.

5) Said temperature sensitive portion is formed by a thermocouple.

6) Said temperature sensitive portion is formed by a thermistor.

7) Said annular elastic member is formed by connecting both sides of an elastic sheet formed into a ladder shape by two long side portions and short side portions connecting between these long side portions with predetermined spacing.

8) The thermometer is regulated such that said annular elastic member keeps the flat condition by fixing a contact plate provided with a supporting bar on each side to an annular elastic member formed by connecting both sides of an elastic sheet: in addition, arranging a temperature sensitive portion between said annular elastic member and said contact plate:

allowing to hold the opposite side of a portion attached said contact plate of said annular elastic member by a support:

pressurizing said annular elastic member flatwise against a supporting face of the support to fix, upon fixing said annular elastic member on said support: in addition, extending side walls of a holder to both sides of said support: and allowing to fit with clearance said supporting bars into the guide holes each constituted by a hole long from side to side formed along an upper edge of said side walls.

9) The thermometer is fixed flatwise by forming two circular arc-shaped projection walls on an upper surface of said support, and allowing to sandwich and hold a portion of said annular elastic member between a supporting surface formed between said projection walls and an under face of said fixture by clearance-fitting a disk-shaped fixture between said projection walls.

10) Said temperature sensitive portion is formed by a thermocouple.

11) Said fixture is disk-shaped, and is arranged to allow to move said fixture to said supporting surface side by forming an oblique face on a side of said fixture, and allowing a tip of a fitting projected from said projection wall side to thrust and contact with said oblique face.

12) Said annular elastic member is formed by connecting both sides of an elastic sheet formed into a ladder shape by two long side portions and short side portions connecting between these long side portions with predetermined spacing.

In this invention, bending stresses are generated in a circular arc-shaped portion of the elastic member arranged on the back of the contact plate by holding under this condition during measurement by manufacturing a elastic sheet using a metal plate, forming an original of an annular elastic member by connecting both ends thereof, and deforming an annular elastic member 2 elastically to deform into a cocoon shape or an oval shape having the major axis and the minor axis after fixing the elastic member on the back of a contact plate. And then, these bending stresses are opposed with equal magnitudes in the opposite direction at both sides.

Therefore, the invention is arranged for elastic force reconstituting to the original cocoon shape or oval shape automatically by the bending stresses of the opposite direction generated in two circular arc-shaped portions to be generated, thereby acting such that the contact plate contacting with the object to be measured on temperature along the surface of the object to be measured on temperature stably, when external force exerts such that this annular elastic member can be deformed in the direction of the major axis (being deformed so as to compress the distance in the direction of the minor axis).

It is important that said annular elastic member is arranged so that local stress can not be generated upon fixing to a support. Namely, when the annular elastic member of the cocoon shape or oval shape is deformed in the direction of the major axis in company with an operation of the temperature measurement, the circular arc-shaped portions formed on both sides oppositely deforms while changing the place thereof in the direction of the major axis. At this point of time, this deform of the circular arc-shaped portions moves in the direction of the major axis laterally while holding the original shape, the contact plate is held from back elastically without any changing in company therewith to be pressurized against the surface of the object to be measured on temperature.

Although the contact plate supported on the annular elastic member is slightly moved laterally in company with the lateral movement of the object to be measured on temperature in the direction of the major axis, this movement should be regulated by a supporting bar provided on both ends of the contact plate.

However, under the condition of the temperature measurement, it is required for this contact plate to act so as to return to the original position by the elastic force of the annular elastic member in addition, it is required that the contact plate is moved along the surface of the object to be measured on temperature upon even moving most laterally so that abnormal deforms such as generating air gaps can not be generated.

In embodiments described below, although the thermocouple is used as the temperature measuring element, this thermocouple is advantageous in a low price and durability. However, various elements such as a temperature measuring element of an other type, for example, a temperature measuring sensor such as a thermistor or the like can be adopted in consideration of a temperature range to be measured.

Moreover, the embodiment is constituted by fixing the annular elastic member on the support using a fixture in addition, combining a holder of a different body. In fact, although it is most suitable to use a means, for example, a guide hole long from side to side, said means being ease to attach and detach the annular elastic member in addition, being able to permit that the supporting bar provided on both ends of the contact plate moves laterally in parallel with the movement direction of the object to be measured on temperature, a guide rail and a guide groove can be used in place of this means.

As the support and the holder are constituted by the different bodies as described above, it is selected as required relating to manufacturing in consideration of various problems of workability or the like such as manufacturing cost, an inspection and repair whether each member is divided into the plural or is constituted integrally.

This invention is not limited to the embodiments described below, within the technical aspect of the invention, that is, the equipment which is arranged for the contact plate to be supported by the annular elastic member, to allow to support said contact plate under the condition deforming this annular elastic member elastically to deform into a cocoon shape or an oval shape having the major axis and the minor axis, to allow to generate the elastic force, that is, the bending stress in two curved surface portions oppositely formed in the direction of the major axis of this annular elastic member, and to allow to act so as to return the contact plate to the original position utilizing these opposite bending stress is included within the technical aspect of the invention. Therefore, apart of the members can be omitted in addition, different members can be added and can be modified within the technical aspect of the invention.

BEST MODE FOR CARRYING OUT THE INVENTION

Subsequently, an operation principle of a contact-type thermometer which is suitable for measuring the temperature of a moving surface according to the invention is described.

Figure 1:
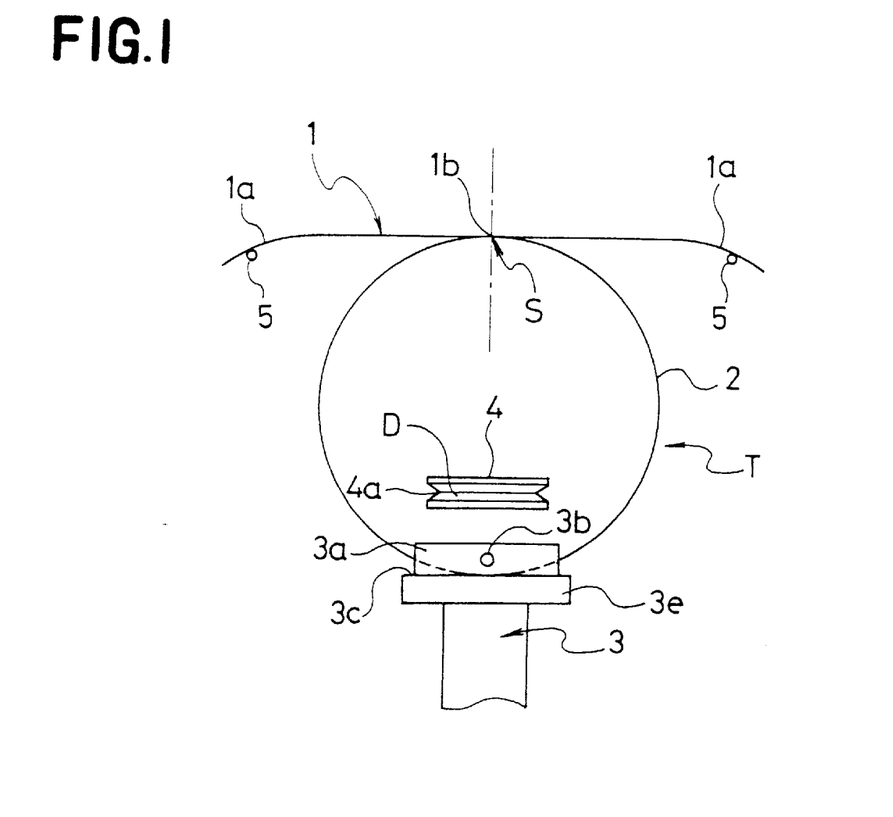
FIG. 1 is a side view of assembly showing parts of a temperature measuring portion in a first assembling process.
Figure 5:
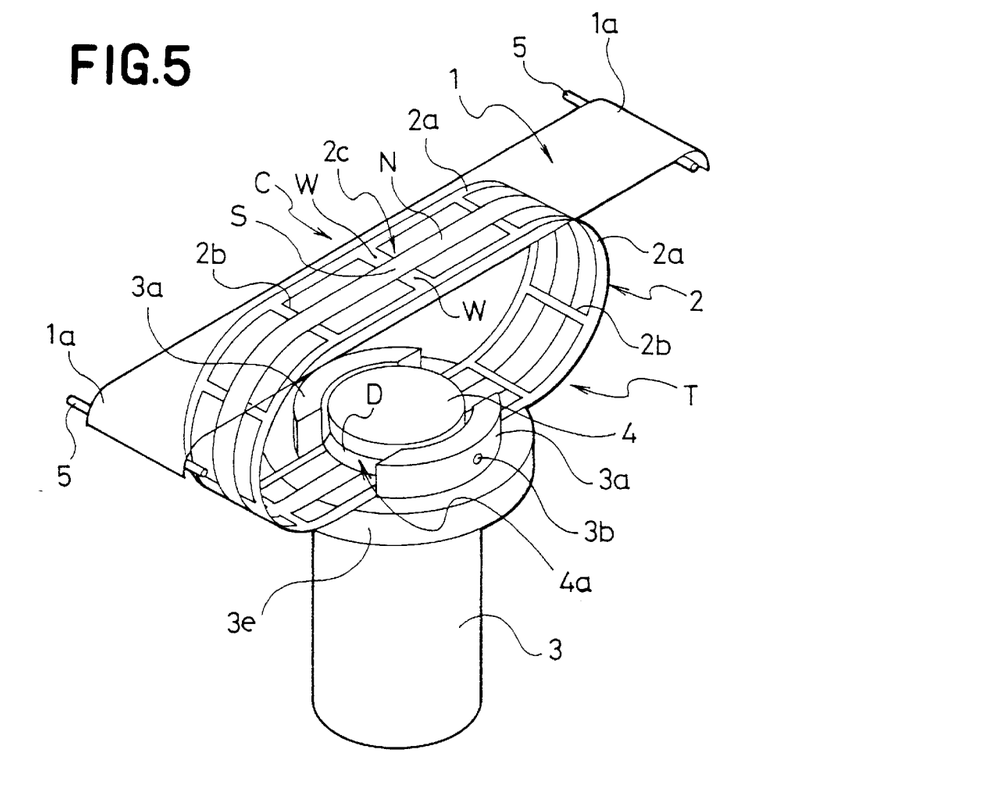
FIG. 5 is a perspective view of the assembly which completed the first assembling process.

FIG. 1 is a side view of assembly showing parts of a temperature measuring portion in "a first assembling process" of primary parts of the contact-type thermometer for measuring the temperature of the moving surface, and an annular elastic member 2 formed by bending a thin metal sheet with elasticity such as a stainless steel into a ring shape to weld both sides is arranged under a central portion of a central portion 1b of a contact plate 1 constituted by a metal sheet with corrosion resistance and high elasticity such as a stainless steel sheet or a metal sheet with high elasticity given a corrosion resistance processing, formed both sides 1a, 1a into a circular arc shape. Moreover, two points (a plurality of points) are fixed by spot welding (W) on a central portion of this contact plate 1 as shown in FIG. 5. Moreover, a supporting bar 5, 5 is welded so as to intersect at right angles to both sides 1a, 1a of said contact plate 1. Moreover, thermocouple wires N are arranged between said both the contact plate 1 and the annular elastic member 2 such that a temperature sensitive portion S is located at a central portion of the contact plate 1 as shown in FIG. 5.

The annular elastic member 2 elastically supporting said contact plate 1 is an important member. An elastic sheet 2A formed a thin stainless steel sheet of 0.5 to 1.0 mm, preferably 0.7 mm in thickness into a ladder shape by etching processing or precision press processing as shown in FIG. 3 is used.

This elastic sheet 2A is formed into a ladder shape as a whole by arranging long side portions 2a and 2a arranged on both sides and short side portions 2b••between these long side portions 2a and 2a with predetermined spacing. In these short side portion 2b••, a temperature sensitive portion fixing portion 2c of which the square measure is enlarged is provided on a portion for fixing the temperature sensitive portion S of the thermocouple wires N (FIG. 5).

Moreover, the annular elastic member 2 as shown in FIG. 1 or the like is formed by providing coupling sides 2d and 2e on end portions of said long side portions 2a and 2a and connecting the opposite coupling sides 2d and 2e together by spot welding or brazing under the condition of rounding the elastic sheet 2A to form into a ring shape (circular shape).

Figure 3:
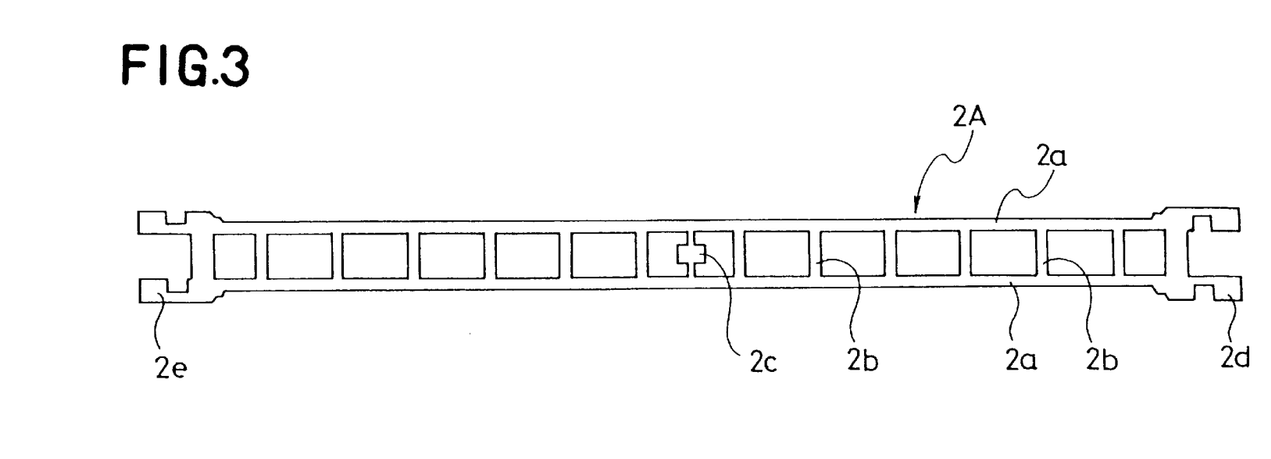
FIG. 3 is a side view of a flat sheet of an original of an annular elastic member.

The reason why said elastic sheet 2A is formed in the ladder shape as shown in FIG. 3 is that elastic force is too large to elastically support the contact plate of the contact-type thermometer in the case of forming the metal sheet with an usually usable thickness into the ring shape merely. On the other hand, it is difficult to form this thin-metal sheet into an accurate circle in addition, to pressurize this to deform into the cocoon shape or the oval shape, and moreover, it becomes unstable to hold the shape thereof in the case of thinning this metal sheet so as to provide elastic force to be required.

Accordingly, in the invention, since elastic force is adjusted by providing openings in the elastic sheet 2A to decrease the square measure as described above, it is preferable to form into the ladder shape when providing openings in well-balanced condition. According to the dimension and the density of these openings, intensity of elastic force and the location can be adjusted, thereby the elastic sheet 2A being able to be deformed into the cocoon shape or the oval shape formed with the smoothly curved surface upon deforming this elastic sheet 2A.

Figure 2:
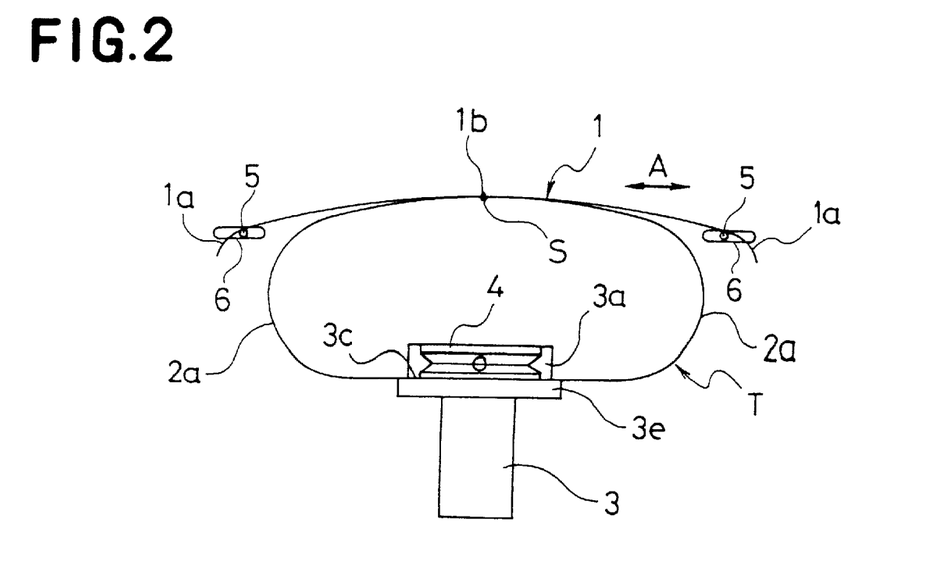
FIG. 2 is a side view of the assembly which completed the first assembling process.

Moreover, although the diameter in the condition this annular elastic member 2 is the circular shape as shown in FIG. 1 is approximate 30 mm, and the major axis in the condition the contact plate 1 is suspended and held through the supporting bar 5 as shown in FIG. 2 and FIG. 3 is approximate 50 mm and the minor axis is approximate 20 mm, these numerical values are varied in accordance with the dimension of the thermometer.

The thermocouple wires N connected the lead wires (not shown) at both sides are arranged on an intermediate position of the long side portion 2a and 2a as shown in FIG. 5, in the case of assembling the elastic sheet 2A of the ladder shape shown in FIG. 3 into the ring shape, the temperature sensitive portion S thereof is place on the temperature sensitive portion fixing portion 2c formed on the central portion of the elastic sheet 2A. Moreover, the contact plate 1 is arranged and laminated thereon, and between the contact plate 1 and the short side portion 2b of both sides of said temperature sensitive portion fixing portion 2c and the temperature sensitive portion S are fixed by spot welding W.

Therefore, at the portion shown by an arrow C in FIG. 5, the thermocouple wires N are arranged on the central portion of the short side portion 2b on which the temperature sensitive portion fixing portion 2c is formed in addition, the contact plate 1 is placed on these thermocouple wires N, in addition, a plurality of points between this contact plate 1 and this the short side portion 2b connected by spot welding W. Therefore, this thermocouple wires N are not fixed by spot welding W, but is sandwiched and held by the short side portion 2b on which the temperature sensitive portion fixing portion 2c is provided and the contact plate 1.

Subsequently, an assembly T of the annular elastic member 2 and the contact plate 1 shown in FIG. 1 or the like is formed by rounding the elastic sheet 2A shown in FIG. 3 and connecting the coupling portions 2d and 2e of both sides thereof together by spot welding or brazing.

Moreover, although the case also is considered that the temperature sensitive portion S of the thermocouple wires N is spot-welded on the temperature sensitive portion fixing portion 2c, judging from a large number of experiences of this inventor, utilization of a method pressurizing the temperature sensitive portion S against the back of the contact plate 1 to allow to contact as described above is more advantageous in temperature measuring accuracy and durability, in this meanings, it is thought that not fixing the thermocouple wires N on the annular elastic member 2 by spot welding W is better.

Moreover, although a method, initially, rounding the elastic sheet 2A shown in FIG. 3 to form the annular elastic member 2 may be utilized, said process is excellent, taking assembling accuracy into account.

When the assembly T connected the contact plate 1 and the annular elastic member 2 is formed by said "first assembling process", the "second assembling process" described below is performed.

In this "second assembling process", the central lower portion of the annular elastic member 2 is arranged between two circular arc-shaped projection walls 3a and 3a formed on both sides of the upper portion of a support 3 as shown in FIG. 1, FIG. 2 and FIG. 5.

Next, the assembly T is formed by clearance-fitting a disk-shaped fixture 4 such that an under face of the central portion of the annular elastic member 2 can be positioned between these projection walls 3a and 3a, screwing a machine screw into a screw hole 3b provided on the central portion of said two projection walls 3a and 3a, projecting the tip portion thereof into the headband like groove portion 4a formed on a side of the fixture 4 to fix the fixture 4 on the predetermined location between two projection walls 3a, and sandwiching, holding and fixing the under face of the annular elastic member 2 between this fixture 4 and a supporting face 3c formed between the projection walls 3a.

Said groove portion 4a is formed into an isosceles V-shaped portion, in this embodiment, and the tip of the machine screw screwed into the screw hole 3b contacts with the midpoint portion of the oblique face D of the underside to pressurize, whereby the force pushing down the fixture 4 to the support 3 side is generated, thereby the central portion of the under face of the annular elastic member 2 being designed be pressurized between the supporting face 3c of this support 3 and the under face of said fixture 4 and to be supported.

Moreover, although the case is shown in the drawings that the groove portion 4a with the V-shaped portion is provided, it may be the method that the oblique face D of the underside is elongated in addition, that the major portion is formed on the oblique face with a different angle of the oblique face D of the underside, whereby the distance that the fixture 4 is pushed down is elongated due to the movement back and forth. The annular elastic member 2 arranged on the supporting face 3c between the projection walls 3a and 3a formed on the upper end of the support 3 is pressurized by the fixture 4 to fixed on the support 3 as described above.

The reason why such method fixing the annular elastic member 2 is utilized is that it is to avoid to give the local deform to the annular elastic member 2 of which the original shape is the circular shape or the ring shape or to form the portion with poor elastic force by providing a mounting hole on the annular elastic member 2. Furthermore, it is in order for the contact plate 1 to be supported stably by forming the elastic sheet 2A into an annular shape, assembling the assembly T as shown in FIG. 1, in addition, generating the equal elastic forces at the curved surface portions of right and left sides upon deforming into the cocoon shape or the oval shape as shown in FIG. 2 and FIG. 5.

Figure 4:
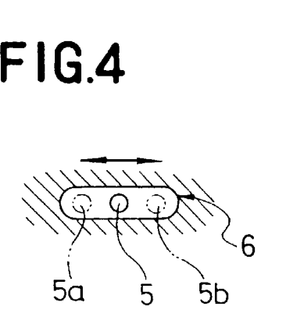
FIG. 4 is a view showing a relationship between a supporting bar and a guide hole.
Figure 6:
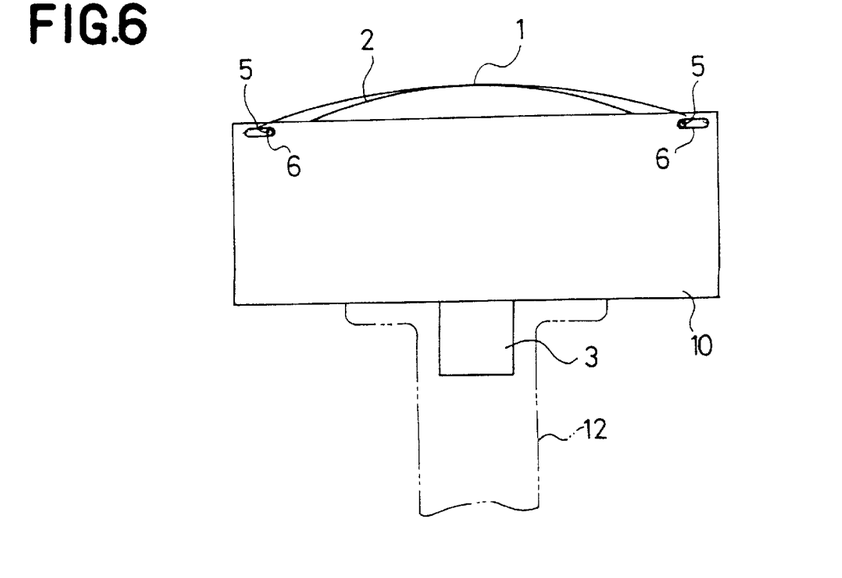
FIG. 6 is a side view of the temperature measuring portion which completed a second assembling process.
Figure 7:
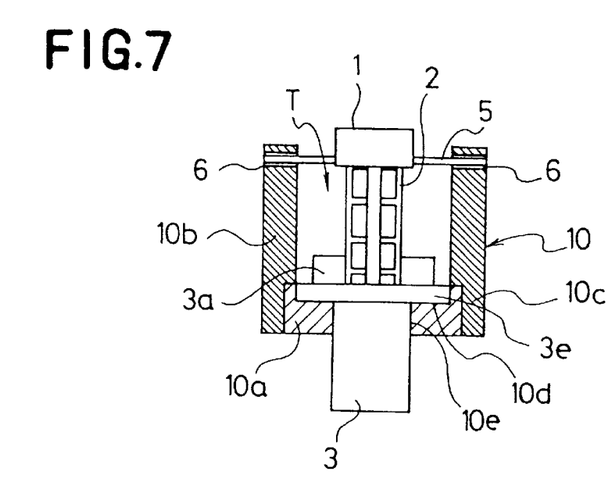
FIG. 7 is a transverse cross-section of the temperature measuring portion in FIG. 6.
Figure 8:
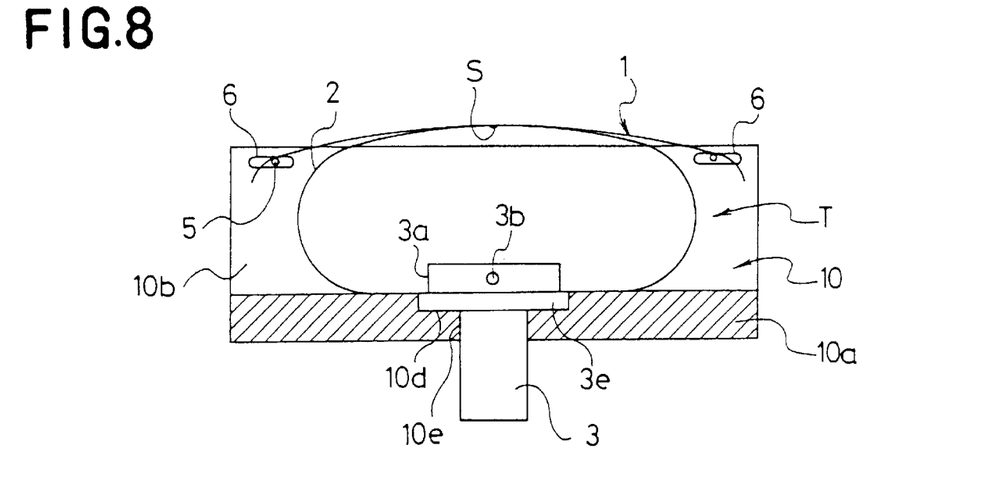
FIG. 8 is a side cross-section of the temperature measuring portion in FIG. 6.

FIG. 6 is a side view showing the primary portions of the contact-type thermometer, FIG. 7 is a transverse cross-section of the temperature measuring portion and FIG. 8 is a side cross-section of the temperature measuring portion, and the assembly T shown in FIG. 5 is assembled into the structure of said drawings at "a third assembling process" described below. Moreover, FIG. 4 is a view showing a relationship between a supporting bar 5 and a guide hole 6 provided on a holder 10.

The holder 10 is designed to finish the portion into an U-shape by arranging side sheet portions 10b and 10c on both sides of a bottom plate portion 10a. Moreover, it may be designed to form any one set of the bottom plate portion 10a, the side sheet portions 10b or 10c integrally to form a holder body with a portion of a L-shape to assemble the remaining side sheet portions thereon. Moreover, it is designed to provide the guide hole 6 constituted by a hole long from side to side along this upper edge on the vicinity of the upper edge of said side sheet portions 10b and 10c to fit with a play the supporting bar 5 provided on both ends of the contact plate 1 into this guide hole 6. This supporting bar 5 is designed to be movable within the distance from reference character 5a to 5b in the guide hole 6 as shown in FIG. 4.

Moreover, although this guide hole 6 is opened through the side sheets 10b and 10c in said embodiment, the holder 10 with a good design can be formed, forming an elongated hole on the rear side in such manner to remain a wall thickness of the front side of the side sheet portions 10b and 10c.

Although the material of this holder 10 is selected in consideration of the temperature range of the object to be measured on temperature, synthetic resin moldings are used for an usual thermometer and ceramic is used for high temperature thermometer.

Moreover, a concave 10d in which the flange portion 3e of the support 3 is fitted and a through-hole 10e are formed on said the bottom plate portion 10a as shown in FIG. 7 and FIG. 8 and a mounting portion of the support 3 of the assembly T shown in FIG. 5 is inserted into said through-hole 10e, in addition, the flange portion 3e is fitted into the concave 10d to be assembled, and the assembly is fixed by a machine screw (not shown).

Furthermore, the assembly that the holder 10 is built in said assembly T is fitted on the tip of a cylindrical holder 12 and the lead wires connected to the thermocouple wires N are introduced in this holder 12, thereof to be connected to the temperature measuring portion of the contact-type thermometer as shown in FIG. 6. However, this measuring portion is the same as prior equipment in the viewpoint of being connected to a measuring equipment measuring electromotive force of the thermocouple wires N and a display equipment to display the temperature. Moreover, the dimension of the holder shown in FIG. 6 to FIG. 8 is designed in 30 mm in width, 60 mm in length and 25 to 30 mm in height.

Subsequently, a contact-type thermometer according to the invention is described referring to FIG. 9 to FIG. 13.

Figure 9:
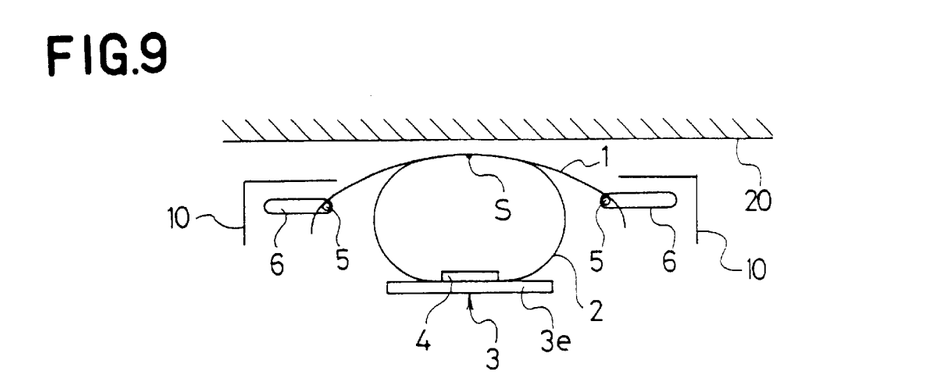
FIG. 9 is an illustration showing action of the annular elastic member and a contact plate.

FIG. 9 is a schematic representation showing the condition that the contact plate 1 does not thrust and contact with the object to be measured on temperature 20, that is, the same condition as FIG. 8, and in this condition, the central portion of the contact plate 1 is inflated in an arcuate shape against the object to be measured on temperature 20 by elastic force of the annular elastic member 2, said force acting to make itself a circular shape. In this condition, the supporting bars 5 and 5 shift to the inside of the guide holes 6 and 6, and the contact plate 1 is limited so as to not further inflate. Moreover, said drawings are described to adopt the description of a assembling process of the thermometer referred to FIG. 1 to FIG. 7, and in an actual measurement of the temperature, the operation that the thermometer is made contact from the upper against the object to be measured on temperature is performed frequently.

Figure 10:
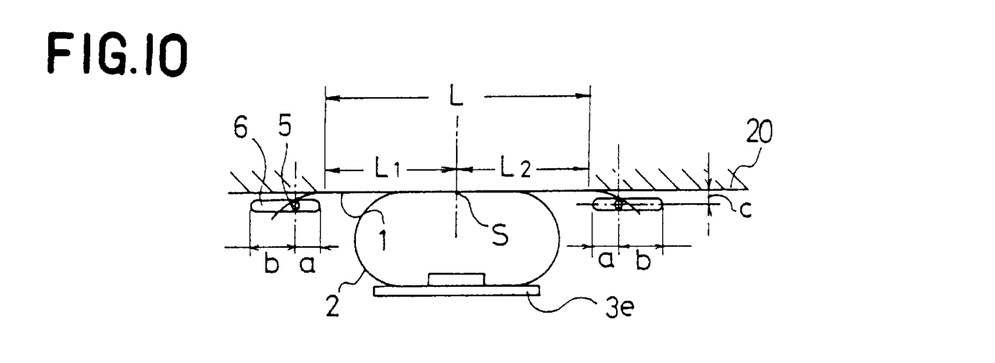
FIG. 10 is an illustration showing action of the annular elastic member and the contact plate.

FIG. 10 shows the condition that the contact plate 1 contacts with the object to be measured on temperature 20 with a contact length L. This condition shows the case that the object to be measured on temperature 20 is not in movement or moves at low speed, in which the temperature sensitive portion S is positioned at the central portion of the contact-type thermometer (the assembly T), and the contact length L1 and L2 measured from the temperature sensitive portion S are equal distances and the location of the supporting bar 5 within the guide hole 6 is in the condition (a<b), when an inside distance is defined as "a" and when an outside distance of an remote side as "b".

With regard to an eccentric distance C from the surface of the object to be measured on temperature 20 with which the temperature sensitive portion S contacts to the center of the guide hole 6, the distance as small as possible can keep the contact plate 1 in a flat condition, thereby being able to guide without floating the central portion thereof more than the object to be measured on temperature 20. However, since the eccentric distance C can not be made zero due to the structure, this the eccentric distance C should be considered so as to make as small as possible upon designing the thermometer.

Figure 11:
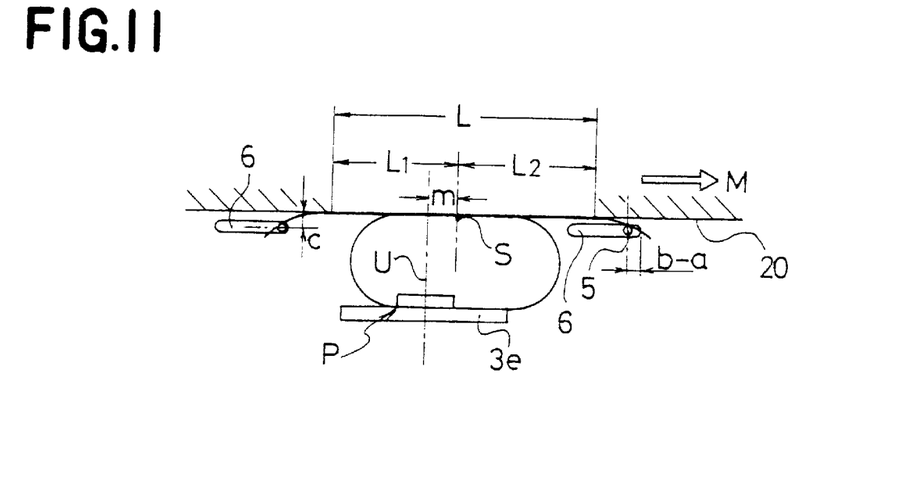
FIG. 11 is an illustration showing action of the annular elastic member and the contact plate.

FIG. 11 shows a relationship among the deform condition of the annular elastic member 2, the supporting bar 5 and the guide hole 6 where the object to be measured on temperature 20 moves in the direction of an arrow M to the contact plate 1. In this case, this contact plate 1 is dragged in company with the movement of the object to be measured on temperature 20 by friction, and at last, the supporting bar 5 of the left side contacts with the right side of the guide hole 6.

In this case, the temperature sensitive portion S shifts in the direction of an arrow M by distance "m" to the center line U of the support 3 and the contact length L shifts to said side of the arrow M, so that the contact length L becomes (L1<L2) in company with the movement of the annular elastic member 2.

Moreover, the clearance between the supporting bar 5 of the right side and the right side of the guide hole 6 becomes (b−a). Namely, it is important that the supporting bar 5 of the right side, still more, has a play between the right side of the guide hole 6, in the condition that the supporting bar 5 of the left side is suspended and held by the right side of the guide hole 6. Thus, when it becomes the condition that the supporting bar 5 of an upstream side (the left side) is suspended and held by the end of the guide hole 6, the contact plate 1 is pulled to the side of the arrow M with this supporting bar 5 as a starting point. However, since the supporting bar 5 is not suspended and held by the guide hole 6, the compression stress by which this contact plate 1 is swelled is not generated, whereby the end of an downstream side (the right side) can not be floated, so that the contact plate 1 is allowed to contact with the surface of the object to be measured on temperature 20.

Moreover, it should be considered that the contact length L becomes small, and the contact square measure becomes small in company therewith, whereby thermal conduction to the contact plate 1 becomes tendency to be poor, when the surface of the object to be measured on temperature 20, that is, the eccentric distance C between the temperature sensitive portion S and the guide hole the guide hole 6 becomes large.

Figure 12:
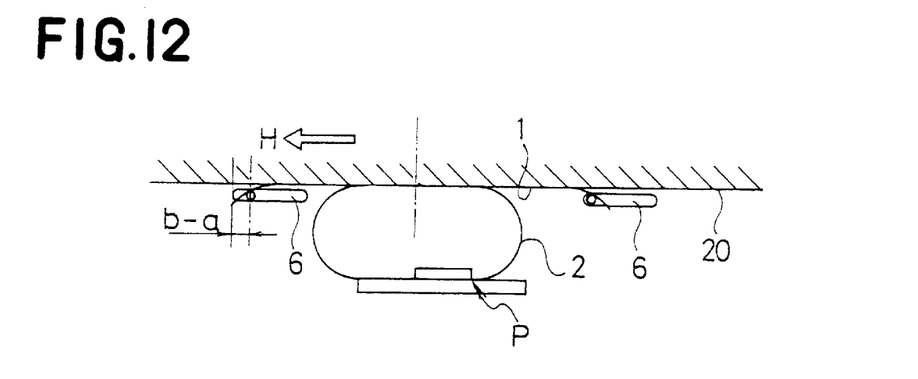
FIG. 12 is an illustration showing action of the annular elastic member and the contact plate.

FIG. 12 shows the condition where the object to be measured on temperature 20 moves in the direction of an arrow H (the left side) and is responds to the opposite direction of FIG. 11.

As is understood referring to the FIG. 11 and FIG. 12, although the annular elastic member 2 deforms into the cocoon shape or the oval shape in the direction of the arrow M or in the direction of the arrow H in accordance with the movement of the contact plate 1, the annular elastic member 2 is not deformed extremely, therefore, no stress concentrates to this original position P, said position P being the original point that this annular elastic member 2 are sandwiched and held between the flange portion 3e and the fixture 4, whereby the fundamental shape of the annular elastic member 2 is unchanged to the case of FIG. 10 substantially.

Figure 13:
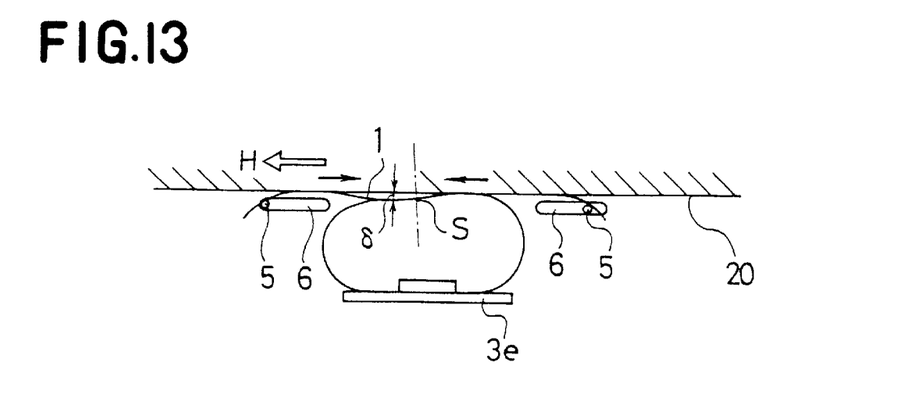
FIG. 13 is an illustration showing an operation failure condition of the annular elastic member and the contact plate.

Referring to FIG. 12, the case that the clearance (b−a) is formed between the supporting bar 5 and the right side of the guide hole 6 is shown and FIG. 13 shows the case that said clearance (b−a) disappeared. The case of FIG. 13 implies the condition that the supporting bar 5 of the left side contact with the left side of the guide hole 6 and accordingly, the movement of the contact plate 1 in the direction of an arrow H is blocked, whereby the distance the supporting bar 5 and the guide hole 6 in FIG. 10 became (a>b), it will be understood that the contact plate 1 deforms irregularly as is illustrated, so that the clearance of δ is generated between the contact plate 1 and the object to be measured on temperature 20, and the temperature sensitive portion S provided on the central portion of the contact plate 1 is floated in company therewith, thereby the measurement of temperature to become impossible.

This invention is constituted as described above, whereby the following effects are performed:

A) According to the invention of claim 1, since a contact plate 1 is allowed to support through a guide hole 6 under the condition that an annular elastic member 2 formed into an annular shape (the original is a circular shape) is pressurized to be deformed into a cocoon shape or an oval shape having a major axis and a minor axis, an elastic force generated in curved surface portion oppositely formed a side of the annular elastic member 2 acts on the contact plate 1 so as to keep in the original position, and moreover, a central portion of this contact plate 1 is pressurized concavely at all time so as to inflate to an object to be measured the temperature side, whereby a temperature sensitive portion S can be pressurized to a surface of a moving object properly, even though the contact plate 1 is subjected to move laterally in contact with the surface of the moving object, so that an accurate temperature can be measured.

B) According to the invention of claim 2, supporting bars 5 and 5 are limited within lateral movement of guide holes 6 and 6, thereby, as a result, allowing to move laterally in the direction of the movement of an object to be measured on temperature to form no air gap between the contact plate 1 and the object to be measured on temperature and to be able to generate no error in the result of temperature measurement.

C) According to the invention of claim 3, the strength of a contact-type thermometer can be improved.

D) According to the invention of claim 4, curved surface portions are formed oppositely in the direction of the major axis of the annular elastic member 2, so that reconstituting force is given to the contact plate 1 by opposite stresses generated in the portions thereof.

E) According to the inventions of claim 5 and claim 6, the contact-type thermometer which is various temperature sensors can be used as the temperature sensitive portion S, and low price and excellent in durability can be provided.

F) According to the invention of claim 7, the contact-type thermometer in which the elastic force of the annular elastic member 2 can be adjusted readily, in addition, which is excellent in manufacturing and handling ability can be provided.

G) According to the invention of claim 8, the contact-type thermometer which is excellent in assembling ability and readily to manufacture can be provided.

H) according to the invention of claim 9, local stress can not be generated in the annular elastic member 2, so that the curved surface portions of the right and left can be formed into the same shape substantially, whereby the accurate temperature can be measured by laying the contact plate 1 along the surface of the object to be measured on temperature.

What is claimed is:

1. A contact type thermometer assembly comprising:
   a contact plate supported by a support bar on each side of said contact plate;
   an annular elastic member having an exterior surface and an interior surface, said annular elastic member formed of an elastic sheet, said elastic sheet having a first coupling end and a second coupling end, wherein said annular elastic member is formed when said first and second coupling ends are connected to each other;
   a temperature sensitive portion located at a central position of said contact plate between said annular elastic member and said contact plate;
   a support having a support face facing said exterior surface of said annular elastic member and a fixture clearance fit above said support face and facing said interior surface of said annular elastic member, wherein said annular elastic member is held between said fixture and said support face of said support; and
   a holder having oblong guide holes, wherein said support bars are clearance fit into said guide holes such that at the side in which said temperature sensitive portion is located, said contact plate contacts in parallel an object to be temperature measured, wherein an elastic force acts on a back of said contact plate by elastically deforming said annular elastic member when said contact plate contacts the object.

2. A contact-type thermometer according to claim 1, wherein each oblong guide hole is located along an upper edge of said holder, and when said contact plate contacts the object to be temperature measured, said supporting bars are located at an intermediate position within said guide holes, and a distance between each of said support bars and both sides of each guide hole is formed such that an inside distance of said annular elastic member of a first side becomes shorter than an outside distance of the other side.

3. A contact-type thermometer according to claim 1, wherein said support and said holder are integrally formed.

4. A contact-type the thermometer according to claim 2, wherein said annular elastic member is elastically deformed into a symmetric shape selected from a group including cocoon and an oval when said contact plate contacts in parallel the object to be temperature measured.

5. A contact-type thermometer according to claim 1, wherein said temperature sensitive portion is a thermocouple.

6. A contact-type thermometer according to claim 1, wherein said temperature sensitive portion is a thermistor.

7. A contact-type thermometer according to claim 1, wherein said annular elastic member comprises a plurality of sets of opposing long side portions, each set of opposing long side portions connected by a short side portion at a predetermined spacing.

8. A method of regulating a contact-type thermometer assembly having a contact plate and an annular elastic member such that the annular elastic member remains flat when the contact plate is contacting an object to be temperature measured, the method comprising the following steps:
   fixing the contact plate provided with a supporting bar on each side to the annular elastic member;
   arranging a temperature sensitive portion between the annular elastic member and the contact plate;
   holding the annular elastic member between a fixture and a support, wherein the fixture is clearance fit above the support;
   pressing the annular elastic member flatwise against a supporting face of the support; and
   clearance fitting the supporting bars into oblong guide holes formed along an upper edge of each side wall of the holder.

9. A method of regulating a contact-type thermometer assembly according to claim 8 further comprising the steps of clearance fitting a fixture between two circular arc-shaped projection walls formed on an upper surface of the support and holding a portion of the annular elastic member between an underface of the fixture and a supporting surface formed between the projection walls.

10. A method of regulating a contact-type thermometer assembly according to claim 8, wherein the temperature sensitive portion is a thermocouple.

11. A method of regulating a contact-type thermometer assembly according to claim 9 wherein the fixture is disk-shaped and arranged to allow to move the fixture to the supporting surface by forming an oblique face on a side of the fixture and allowing a tip of a fitting projected from the projection wall side to thrust and contact with the oblique face.

12. A method of regulating a contact-type thermometer assembly according to claim 8, wherein the annular elastic member comprises first and second coupling ends, a plurality of sets of opposing long side portions, and a short side portion connecting each set of opposing long side portions at a predetermined spacing, wherein the annular elastic member is formed into a ladder shape by connecting the first and second coupling ends together.

* * * * *